(12) United States Patent
Jaiswal et al.

(10) Patent No.: US 11,475,175 B2
(45) Date of Patent: Oct. 18, 2022

(54) INTELLIGENT DESIGN STRUCTURE SELECTION IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US); Paul Krystek, Highland, NY (US); Shikhar Kwatra, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 579 days.

(21) Appl. No.: 16/008,497

(22) Filed: Jun. 14, 2018

(65) Prior Publication Data

US 2019/0384865 A1 Dec. 19, 2019

(51) Int. Cl.

| | |
|---|---|
| *G06T 11/60* | (2006.01) |
| *G06N 5/04* | (2006.01) |
| *H04L 29/08* | (2006.01) |
| *G06F 30/13* | (2020.01) |
| *H04L 67/306* | (2022.01) |
| *G06N 20/00* | (2019.01) |
| *H04L 67/12* | (2022.01) |
| *G06F 111/02* | (2020.01) |

(52) U.S. Cl.
CPC ............... *G06F 30/13* (2020.01); *G06N 5/04* (2013.01); *G06N 20/00* (2019.01); *H04L 67/306* (2013.01); *G06F 2111/02* (2020.01); *G06T 11/60* (2013.01); *H04L 67/12* (2013.01)

(58) Field of Classification Search
CPC ........... G06F 17/5004; G06F 2217/04; G06N 99/005; G06N 5/04; G06T 11/60; H04L 67/12; H04L 67/306
See application file for complete search history.

(56) References Cited

U.S. PATENT DOCUMENTS

| | | | |
|---|---|---|---|
| 5,680,305 A | 10/1997 | Apgar, IV | |
| 7,043,501 B2 | 5/2006 | Schiller | |
| 2002/0035535 A1 | 3/2002 | Brock, Sr. | |
| 2002/0138170 A1* | 9/2002 | Onyshkevych | ........ G06Q 30/06 700/130 |

(Continued)

OTHER PUBLICATIONS

Ernesto Diaz-Aviles, "A Glimpse into Deep Learning for Recommender Systems", published on Jun. 7, 2017 to https://medium.com/libreai/a-glimpse-into-deep-learning-for-recommender-systems-d66ae0681775, retrieved on Feb. 1, 2021. (Year: 2017).*

(Continued)

*Primary Examiner* — Shourjo Dasgupta
(74) *Attorney, Agent, or Firm* — Griffiths & Seaton PLLC

(57) ABSTRACT

Embodiments for intelligent design structure selection in an Internet of Things (IoT) computing environment by a processor. Levels of satisfaction and behavior patterns of one or more users having similar user profiles influencing the behavior patterns may be learned and evaluated. One or more design structure solutions may be cognitively suggested according to the levels of satisfaction and the behavior patterns.

20 Claims, 8 Drawing Sheets

(56) References Cited

U.S. PATENT DOCUMENTS

| | | | | |
|---|---|---|---|---|
| 2011/0119161 | A1* | 5/2011 | Van Treeck | G06Q 30/02 |
| | | | | 705/27.2 |
| 2011/0307425 | A1* | 12/2011 | Wang | G06F 16/583 |
| | | | | 706/12 |
| 2013/0304758 | A1* | 11/2013 | Gruber | G06F 16/248 |
| | | | | 707/769 |
| 2014/0095122 | A1 | 4/2014 | Appleman et al. | |
| 2014/0278264 | A1* | 9/2014 | Bukhin | G06F 30/13 |
| | | | | 703/1 |
| 2015/0324940 | A1 | 11/2015 | Samson et al. | |
| 2016/0378861 | A1* | 12/2016 | Eledath | G06K 9/00718 |
| | | | | 707/766 |
| 2017/0019496 | A1* | 1/2017 | Orbach | G06N 5/02 |
| 2017/0032481 | A1* | 2/2017 | D'souza | G06Q 30/0627 |
| 2017/0076408 | A1* | 3/2017 | D'Souza | G06Q 10/20 |
| 2017/0351417 | A1* | 12/2017 | Manico | G06F 16/50 |
| 2018/0012242 | A1* | 1/2018 | Phan | G16H 40/67 |
| 2018/0107269 | A1* | 4/2018 | Benzies | G06F 3/012 |
| 2018/0108272 | A1* | 4/2018 | Ahmad | G09B 19/0092 |
| 2018/0145934 | A1* | 5/2018 | Pappu | H04L 12/1822 |
| 2018/0253780 | A1* | 9/2018 | Wang | H04L 51/02 |
| 2018/0308100 | A1* | 10/2018 | Haukioja | G06N 5/04 |

OTHER PUBLICATIONS

MathWorks, "What is Deep Learning? | How it Works, Techniques & Applications—MATLAB & Simulink", published on May 30, 2017 to https://www.mathworks.com/discovery/deep-learning.html, retrieved on Feb. 1, 2021. (Year: 2017).*

Yann LeCun, Yoshua Bengio, and Geoffrey Hinton, Nature, "Deep Learning" published on May 27, 2015 to https://www.nature.com/articles/nature14539, retrieved on Feb. 1, 2021. (Year: 2015).*

Larry Hardesty, MIT News Office, "Explained: Neural Networks", published on Apr. 14, 2017 to https://news.mit.edu/2017/explained-neural-networks-deep-learning-0414, retrieved on Feb. 1, 2021. (Year: 2017).*

Michael Copeland, NVIDIA Blog, "What's the Difference Between Artificial Intelligence, Machine Learning and Deep Learning?", published on Jul. 29, 2016 to https://blogs.nvidia.com/blog/2016/07/29/whats-difference-artificial-intelligence-machine-learning-deep-learning-ai/, retrieved on Feb. 1, 2021. (Year: 2016).*

Nahua Kang, Towards Data Science, "Introducing Deep Learning and Neural Networks—Deep Learning for Rookies", published on Jun. 18, 2017 to https://towarddatascience.com/introducing-deep-learning-and-neural-networks-deep-learning-for-rookies-1-bd68f9cf5883, retrieved on Feb. 1, 2021. (Year: 2017).*

Amazon Web Services, "Deep Learning on AWS", published on Aug. 10, 2017 to https://aws.amazon.com/deep-learning/, retrieved on Feb. 1, 2021. (Year: 2017).*

Aditya Singh, Harvard Business Review, "Deep Learning Will Radically Change the Ways We Interact with Technology", published on Jan. 30, 2017 to https://hbr.org/2017/01/deep-learning-will-radically-change-the-ways-we-interact-with-technology, retrieved on Feb. 1, 2021. (Year: 2017).*

NVIDIA Developer, "Deep Learning", published on May 5, 2018 to https://developer.nvidia.com/deep-learning, retrieved on Feb. 1, 2021. (Year: 2018).*

Libo Zhang, Tiejian Luo, Fei Zhang, and Yanjun Wu, IEEE Access, update published on Mar. 13, 2018 to https://ieeexplore.ieee.org/stamp/stamp.jsp?arnumber=8247172, retrieved on Feb. 1, 2021. (Year: 2018).*

McFadden, "Modeling the Choice of Residential Location," TRB Research Record No. 673, Transportation Forecasting and Travel Behavior,http://onlinepubs.trb.org/Onlinepubs/trr/1978/673/673-012.pdf, https://trid.trb.org/view.aspx?id=87722, 1978 (6 pages).

Anonymous, "A Method and System for Identifying an Optimal Real Estate Location Based on Multi-Variate User Parameters," An IP.com Prior Art Database Technical Disclosure, IP.com No. IPCOM000246019D, Apr. 26, 2016 (6 pages).

Kim et al., "Life Cycle and Environmental Factors in Selecting Residential and Job Locations," Housing Studies, vol. 20, No. 3, May 2005 (18 pages).

Priebe, "Here's Which US City You Should Live in, Based on Your Myers-Briggs," http://observer.com/2017/05/myers-briggs-personality-type-american-cities/, accessed Oct. 20, 2017 (4 pages).

Puybaret, "Sunlight Simulation—Sweet Home 3D Blog," http://www.sweethome3d.com/blog/2014/11/14/sunlight_simulation.html, accessed Oct. 20, 2017 (4 pages).

Wenzel, "Optimal Home Location suggests a 'greener' place to live," https://www.cnet.com/news/optimal-home-location-suggests-a-greener-place-to-live/, accessed Oct. 20, 2017 (2 pages).

* cited by examiner

1. NIGHT SPRAY RADIANT COOLING
2. SUNSHADES
3. HIGH-PERFORMANCE GLAZING
4. EFFICIENT VENTILATION WITH HEAT RECOVERY
5. RADIANT SLAB HEATING + COOLING
6. LIGHTSHELVES
7. NATURALLY-VENTILATED TOP FLOOR
8. SPECTRALLY-SELECTIVE ROOFING
9. ON-SITE WATER DETENTION
10. FULLY DAYLIT INTERIORS WITH LIGHTING CONTROLS

INTELLIGENT DESIGN STRUCTURE SELECTION IN AN INTERNET OF THINGS (IOT) COMPUTING ENVIRONMENT

BACKGROUND OF THE INVENTION

Field of the Invention

The present invention relates in general to computing systems, and more particularly, to various embodiments for intelligent design structure selection in an Internet of Things (IoT) computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

As great strides and advances in technologies come to fruition, the greater the need to make progress in these systems advantageous for efficiency and improvement such as, for example, using the vast amount of available data for assisting in improvements to the quality of life and appropriate living accommodations.

SUMMARY OF THE INVENTION

Various embodiments intelligent design structure selection in an Internet of Things (IoT) computing environment by a processor, are provided. In one embodiment, by way of example only, a method for intelligent design structure selection in an Internet of Things (IoT) computing environment, again by a processor, is provided. Levels of satisfaction and behavior patterns of one or more users having similar user profiles influencing the behavior patterns may be learned and evaluated. One or more design structure solutions may be cognitively suggested according to the levels of satisfaction and the behavior patterns.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
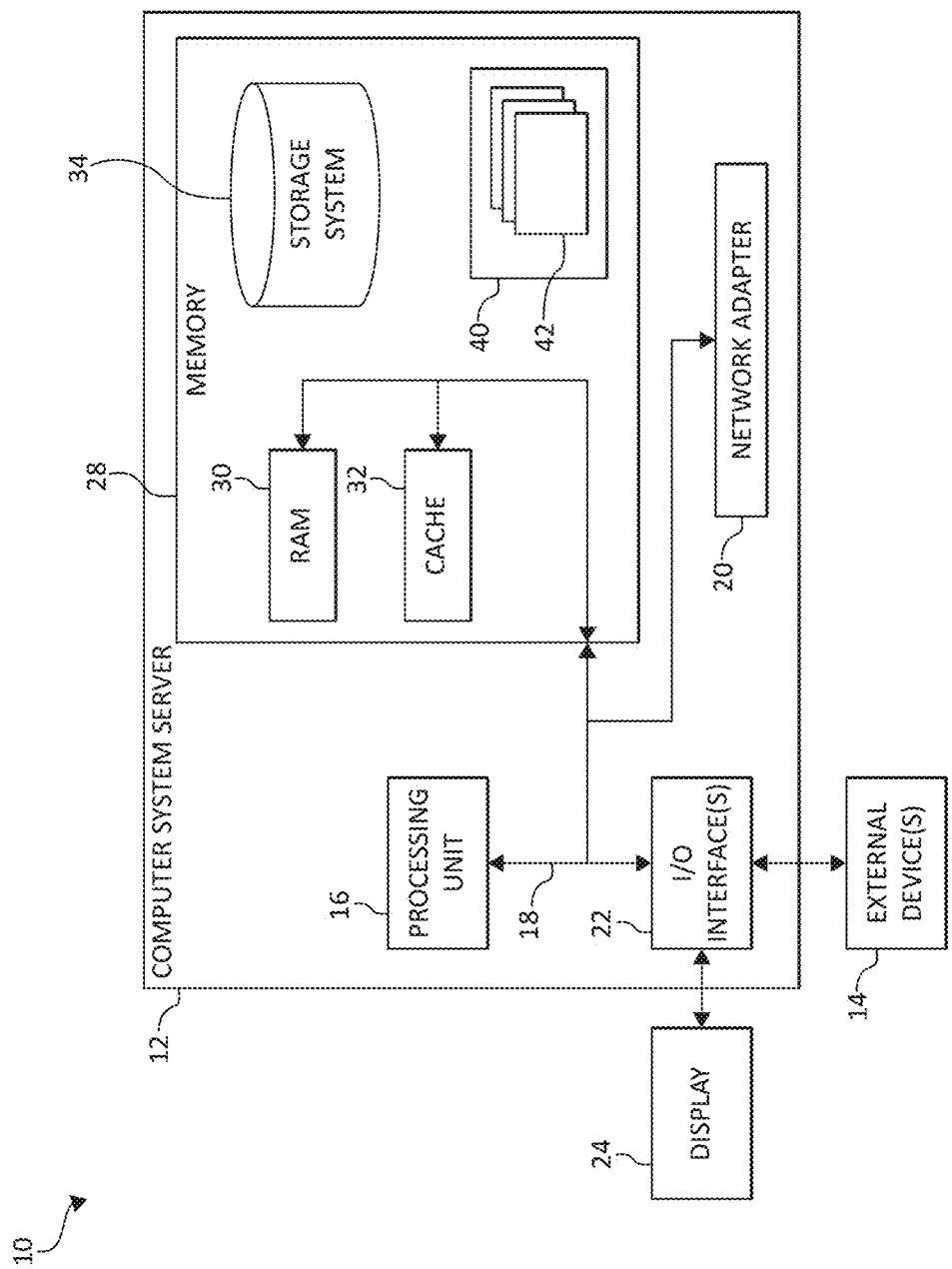
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, the design phase or selection of a new building (e.g., a new home) or modifications to an existing building requires significant time due to the iterative process. Furthermore, searching or selecting a new place and location to live require vast amounts of knowledge in order to satisfy user preferences and needs. Users may desire to understand all the available options, solutions, and possible changes and the effects of the changes (regardless of how significant) to and for new/existing structures, structure designs, modifications, functionality of a building, time schedules, and/or budget. Current options only provide fixed images of buildings or house plans (e.g., two dimensional "2D" or three dimensional "3D") of example images of existing similar homes or proposed design concepts. However, current options fail to provide a cognitive and interactive design structure solutions that are neither dependent on a single user or multi-user preferences. Thus, a need exists for intelligent design structure selection in an Internet of Things (IoT) computing environment using a computing processor.

In one aspect, mechanisms of the illustrated embodiments provide a cognitive system to design, modify, and/or dynamically select a home or structure with enhanced time and cost saving features in a computing environment. Levels of satisfaction and behavior patterns of one or more users, having similar user profiles influencing the behavior patterns, may be learned and evaluated. One or more design structure solutions may be cognitively suggested according to the levels of satisfaction and the behavior patterns.

In an additional aspect, a user and a user's familial associates (e.g., family/relatives) and non-familial associate (friends/co-workers) may be analyzed to suggest one or more changes to a design, modification, and/or a selection to a home and/or structure that are most appropriate for the particular user and/or the user's family. One or more remote, selection locations may be analyzed, and a home and/or structure solution may be dynamically designed, modified, or selected for a user based on user's pattern history, user profile, shared interests or values with one or more persons, and/or a plurality of other factors (e.g., environmental, safety, or proximity to desired interests, etc.) so as to achieve a selected or appropriate level of satisfaction. That is, an appropriate home and/or structure solution may be cognitively determined and provided to achieve a maximum amount of user satisfaction.

The so-called "appropriateness" of home and/or structure solution, such as a new design structure or modification to an existing house, may be subjective and context dependent. For example, one solution for a design, modification, and/or a selection to a house and/or structure may be interpreted and evaluated to be either satisfactory or unsatisfactory depending on the user profile of each user. Accordingly, the so-called "appropriateness" of a particular design, modification, and/or a selection of a house and/or structure may depend greatly upon contextual factors, such as a user profile, environmental factors, and other contextual factors. A deeper, cognitive analysis of the user and/or familial and/or non-familial associates of the user may be provided to further understand the user and/or interpret the appropriate level of satisfaction.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
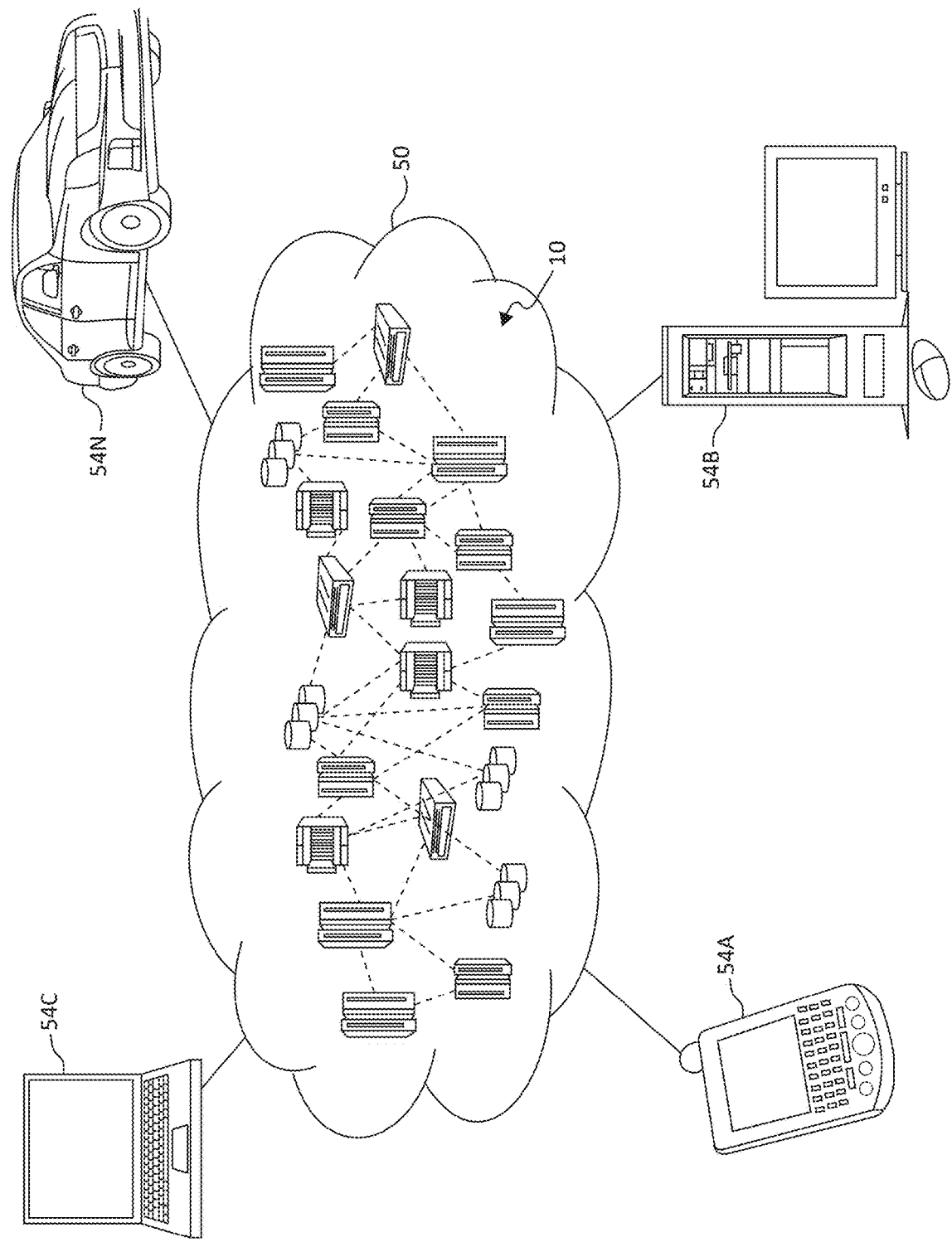
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
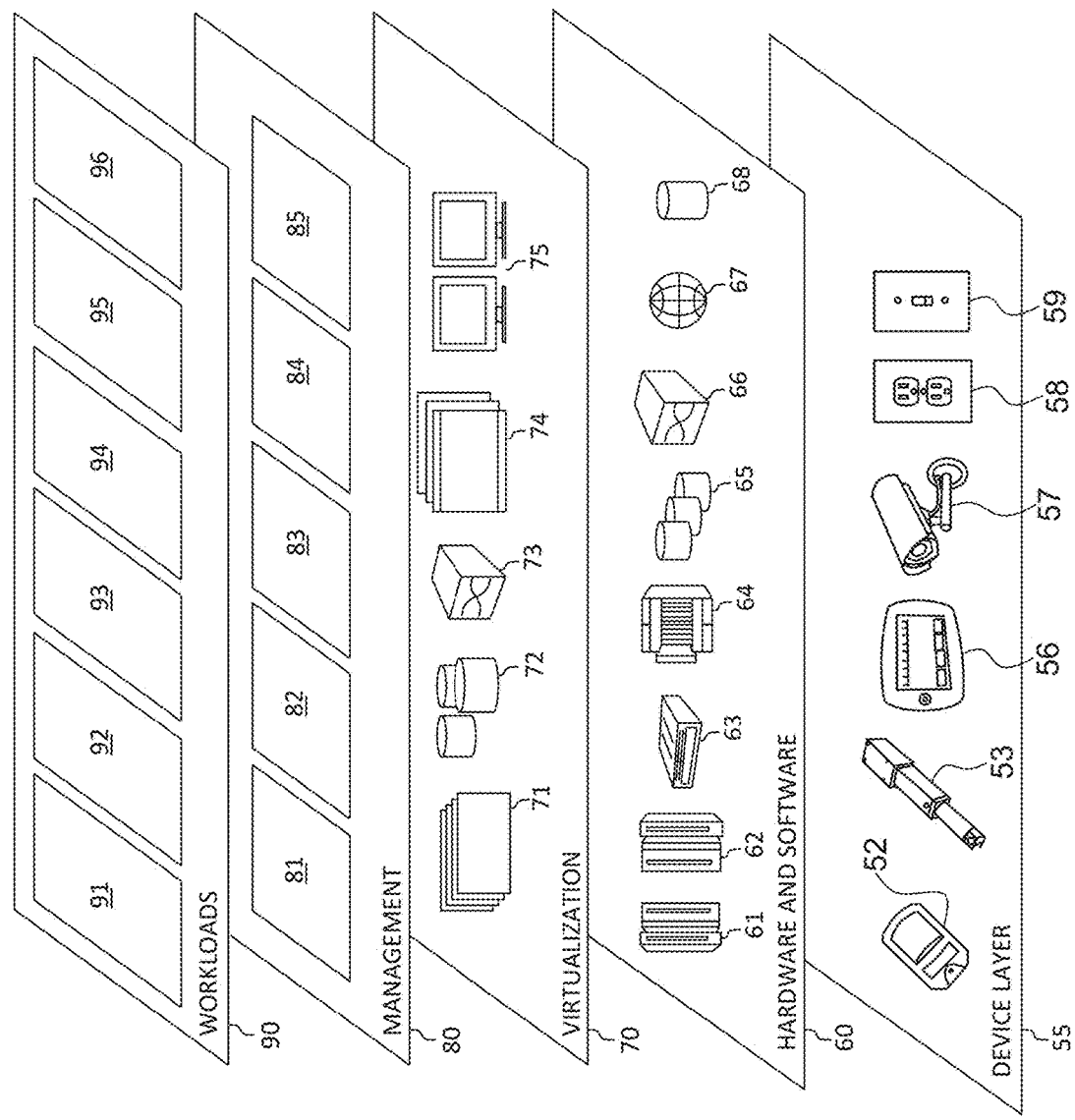
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent design structure selection. In addition, workloads and functions 96 for intelligent design structure selection may include such operations as data analysis, machine learning (e.g., artificial intelligence, natural language processing, etc.), user analysis, familial and/or non-familial associates of a user, as will be further described. One of ordinary skill in the art will appreciate that the workloads and functions 96 for intelligent design structure selection may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide a novel approach for intelligent design structure selection to determine optimal location for new construction or existing structure renovations, and/or to select an alternative living location/structure based on one or more risk factors.

In one aspect, a pattern history of a user, and other users having a user profile with similar characteristics of the user's user profile (e.g., age group, lineage of families/relatives with associated preferences, an income level, etc.), may be cognitively evaluated, learned, and determined. One or more improvements in the design (e.g., new construction, existing structure renovations, etc.) and/or selection of an alternative living location/structure may be based on user's profile and/or one or more various parameters including affordability, geographical location and content, safety, neighborhood sites etc.

A machine learning operation (e.g., deep learning) may be used in order to track pattern history of each user and learn/determine, for each user, different levels of satisfaction and assigning weights to the different satisfaction levels (e.g., assign weights to the different satisfaction levels inputs) as determining factors. For example, the different satisfaction levels may include, but not limited to, proximity to a workplace, proximity to a religious facility, income/budget, one or more IoT security features enabled in the structure/house, geographical content to determine a maximum satisfaction level (e.g., a satisfaction level exceeding a defined satisfaction threshold or percentage), or other user defined satisfaction levels. The satisfaction levels may be evaluated by summation of different weights and determining if the satisfaction levels are greater than the defined threshold based on as the primary inputs (e.g., user preferences that may be input into the machine learning operation) in order to find and determine one or more optimal solutions for the user.

Additionally, day light effects on a structure (e.g., a living location, structure, facility, house, etc.) by changing orientation and/or position of a structure on a map and/or global positioning satellite ("GPS") location.

Figure 4:
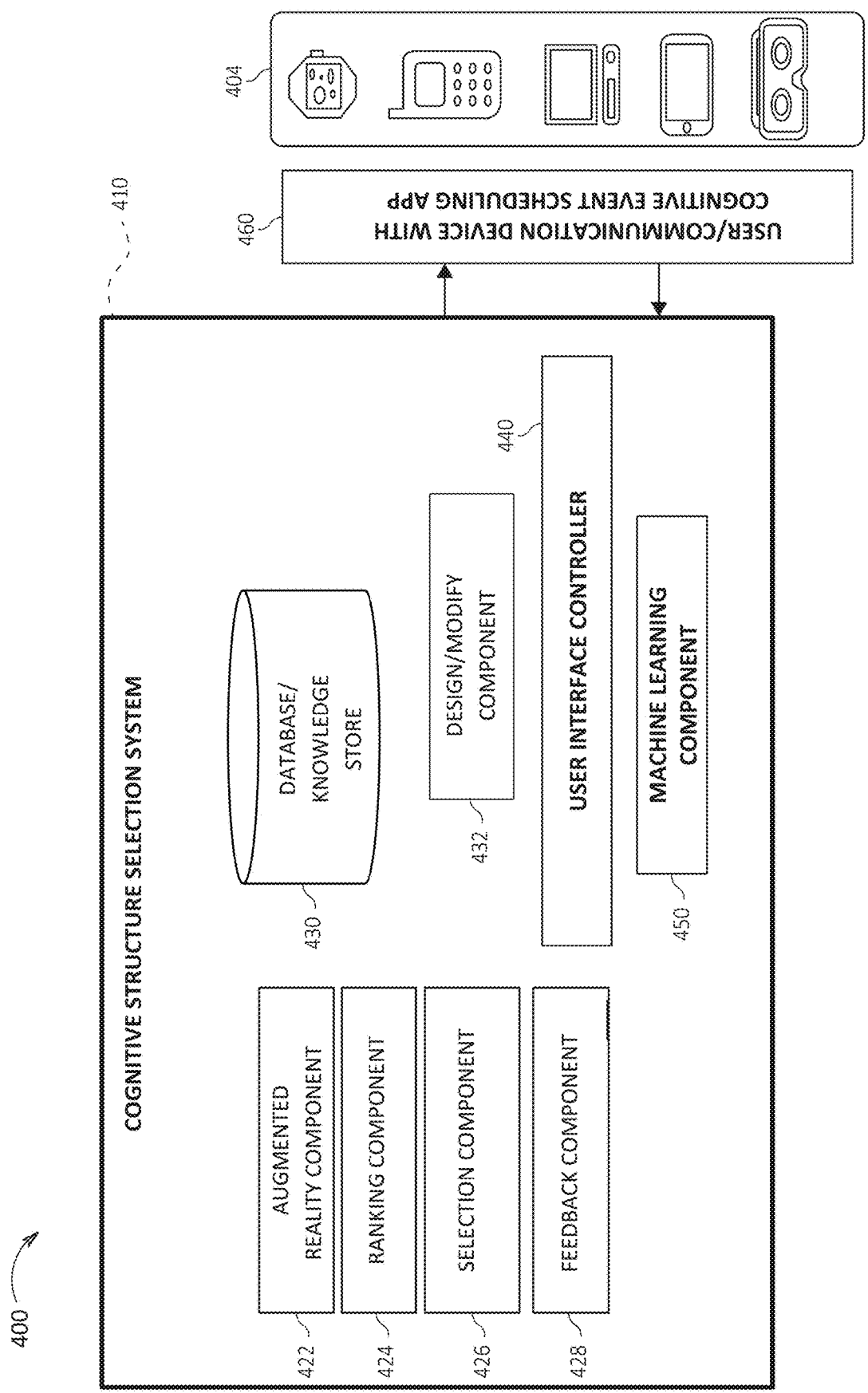
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates intelligent scheduling of events in a computing environment, such as a cognitive structure selection system 410 that may be included in a computing environment, according to an example of the present technology. As will be seen, many of the functional blocks may also be considered "modules" or "components" of functionality, in the same descriptive sense as has been previously described in FIGS. 1-3. For example, computer system/server 12 of FIG. 1 may be included in FIG. 4 and may be connected to other computing nodes and/or one or more Internet of Things (IoT) devices over a distributed computing network, where additional data collection, processing, analytics, and other functionality may be realized. The computer system/server 12 of FIG. 1, may include functional components 400 of the cognitive structure selection system 410 in order to collect, analyze, and process text data, images, video data, audio data, sensor data, or a combination thereof collected from the various computing devices and/or sensors. With the foregoing in mind, the module/component blocks 400 may also be incorporated into various hardware and software components of a system for intelligent scheduling of events in accordance with the present invention. Many of the functional blocks 400 may execute as background processes on various components, either in distributed computing components, or on the user device, or elsewhere.

The system 400 may include the computing environment such as, for example, a cognitive structure selection system 410, user equipment(s) ("UE") 404 (e.g., one or more communication having a cognitive event scheduling applications 460 installed thereon), such as a desktop computer, laptop computer, tablet, wireless communication device (e.g., a smartphone), vehicular communication system, or on-board navigation system, and/or another electronic device that may have one or more processors and memory (e.g., computing devices 54A-N as described in FIG. 2). The cognitive event scheduling system 410 and the devices 404 may each be associated with and/or in communication with each other by one or more communication methods, such as a computing network.

In one aspect, the cognitive structure selection system 410 may be included in a computing system that provides virtualized computing services (i.e., virtualized computing, virtualized storage, virtualized networking, etc.) to devices 404. More specifically, the cognitive structure selection system 410 may be included in a computing system that provides virtualized computing, virtualized storage, virtualized networking and other virtualized services that are executing on a hardware substrate.

As depicted in FIG. 4, the cognitive structure selection system 410 may include an augmented reality ("AR") component 422, a ranking component 424, a selection component 426, a feedback component 428, a database/knowledge store 430, a design/modify component 432, a ("UI") controller 440, and/or a machine learning component 450.

Simply stated, the AR component 422, in association with the machine learning component 450, may learn and evaluate levels of satisfaction and behavior patterns of one or more users having similar user profiles influencing the behavior patterns. The AR component 422, in association with the machine learning component 450, may cognitively suggest one or more design structure solutions according to the levels of satisfaction and the behavior patterns. The machine learning component 450 may monitor and learn the levels of satisfaction and the behavior patterns. The feedback component 428 may collect feedback information of the one or more users relating to the levels of satisfaction, the behavior patterns, and the one or more design structure solutions. The ranking component 424 may rank the one or more design structure solutions according to a determined confidence level (e.g., determine, calculate, and/or assign a rank). In association with the ranking, the ranking component 424 may assign each level of the levels of satisfaction a weighted value indicating a degree of satisfaction (or appropriateness). A confidence level may be determined according to each of the weighted values. The selection component 426, working in conjunction with the design/modify component and the machine learning component, may design, select, or modify the one or more design structure solutions in an augmented reality computing environment. The AR component 422 may simulate day light effects upon a facility by adjusting or modifying an orientation or position of the facility having the one or more design structure solutions.

More specifically, the AR component 422 may provide an augmented reality environment of an area of a plot where a new structure is to be constructed and/or an existing structure is to be modified, which may be via an augmented reality application (e.g., an augmented reality mobile application) to capture a selected area of a plot where the new structure (e.g., a house, apartment, condominium) is to be constructed and/or an existing structure is to be renovated. It should be noted that the plot may be from a database of land plots, building plots, etc. (e.g., maps having property lines, public zoning maps illustrating land classifications for intended usage, set-backs, public code of a community, and/or one or more possible locations for new house construction and/or renovation (which may not require a special use permit and/or zone change)).

Also, the AR component 422 may provide an AR environment (e.g., a dynamic and interactive virtual reality) for a structure identified as a potential solution for user (e.g., a potential home that may be purchased/rented). The AR component 422 may determine and/or calculate the area of the plot. After the area of the plot is calculated, the AR component 422 may use one or more template designs of various structures corresponding to user preferences (e.g., required areas, dimensions, and/or number of levels/floors) and display a 3D picture/display on a computing device such as, for example, one or more computing devices 404 (e.g., an augmented reality computing device, an IoT device, computer, smart phone, or other devices such as computing devices 54A-N described in FIG. 2) via the augmented reality application, which can be accessed via a cloud computing environment.

Upon a user selecting the 3D virtual picture of the plot (which may consider the coordinates and the global positioning satellite ("GPS") location) by the AR component 422, a history of one or more plots constructed on the particular plot or surrounding plots may be accessed and/or retrieved from a database 430 (e.g., cloud computing database).

The AR component 422, in association with the machine learning component 450, may also perform a risk analysis on the plot or surrounding plots by estimating the historical durability of the plots and a building confidence level based on pattern history (which data may be stored/maintained in database 430), while also taking into account environmental factors (e.g., an effect of natural calamity such as, for example, earthquakes, floods, storms, temperature data, etc.) in the selected area to reinforce the confidence level of the user. That is, when a user selects the 3D picture/display of the plot (with the coordinates and the GPS location in consideration), the history of plots constructed on that particular location may be pulled from a cloud computing database DB and a risk analysis may be performed as follows: 1) The durability of the plots in the past may be estimated and building confidence level based on pattern history and user profile of the user (e.g., where the user lived, whether the user desires a yard as compared to a maintenance free yard, or other identified patterns or parameters). 2) The effect of natural calamity (like earthquakes, wild fires, volcanoes, high storm surges, damaging wind proximity to: chemical or nuclear plants, flood plains) may be determined and considered in that area. 3) Based on the pattern history, the satisfaction level and the kind of neighbors the user previously associated with the user may be determined and considered using public and social information (risk of not being in the type of social environment as they would like). 4) Access to one or more selected interests or preferences (e.g., schools, public utilities, shopping centers, religious institutions practiced within the household may be determined. 5) A risk factor may be estimated. 6) By using weighted preferences set by the user, one or more optimal recommendations/solutions may be determined and provided.

The design/modify component 432 may be used to provide one or more designs, modifications, or updates to a new structure to be constructed and/or an existing structure that may be renovated or modified. The design/modify component 432 may also define a user profile for each user according to an age group, one or more familial associates, one or more non-familial associates, an income level, location preferences, safety characteristics of a location, environmental factors, user defined parameters, or a combination thereof. The design/modify component 432 may also define the levels of satisfaction according to design structure features and functionality, a preference for new design structure construction or existing design structure renovation, a physical layout of a design structure, the proximity to one or more types of locations, geographical content, locality rules or legal constraints, budget constraints, internet of things (IoT) devices enabled in the one or more design structure solutions, the user profiles, or a combination thereof.

In one aspect, the selection component 426, working in conjunction with the design/modify component 432 and the machine learning component 450, may cognitively suggest the one or more design structure solutions, and/or cognitively design, select, and/or modify one or more design structure solutions in the AR computing environment. That is, the selection component 426 may provide and/or select one or more optimal solutions for designing, modifying, or selecting a structure. The one or more optimal solutions may be learned, evaluated, and/or determined according to a user profile, a pattern history (which may be included in the user profile), a satisfaction level and community preference, previous assets obtained by the user, dimensions of previous structures (e.g., homes, apartments, condominiums, etc.) associated with the user, cost of various features installed in the previous structures, and/or one or more new inputs to be installed within the similar range in order to provide further satisfaction to the customer.

The machine learning component 450 may use one or more machine learning operations such as, for example, an instance of IBM® Watson® such as Watson® Analytics (IBM® and Watson® are trademarks of International Business Machines Corporation). That is, cognitive reasoning, analytics and/or artificial intelligence (AI) may be used to recognize intent, understand a meaning of the user, search known information about the intended user (e.g. occupants of a structure), use historical data about similar users (e.g., similar occupants), recommend design structure plans (e.g., house plans with features, options, user preferences for desired features, functionality, and/or suggest new or modified design features, options or solutions for new construction and/or renovations of existing structures.

The ranking component 424 may rank the one or more structure solutions according to a determined confidence level. That is, the ranking component 424 may assign each level of the levels of satisfaction a weighted value indicating a degree of satisfaction. A design structure solution may be determined by the selection component 426 according to a confidence level generated by the ranking component 424 based on each of the weighted values.

The selection component 426 may provide one or more recommendations that are provided in a ranked order, using the ranking component, with a confidence level based on a user profile, previous pattern history, and/or satisfaction levels (of which data may be stored in database 430. The cognitive system may provide one or more recommendations that are provided from user with similar user profiles (e.g., income, age group, co-workers, etc.).

The machine learning component 450 may determine, via a machine learning operation, which new construction or renovations historically performed by similar users resulted in an optimal level of satisfaction (e.g., a level of satisfaction above a defined threshold or percentage level). The machine learning component 450 may consider one or more previous built or renovated structures, all labors/efforts and features/functionality of associated with the structure and also a total cost involved, all which data may be retrieved from one or more devices 404, the database 430, and/or cloud computing system of FIG. 2-3. The machine learning component 450 may determine which type of features and/or options produce a maximum satisfaction level (which may be equal to and/or greater than a threshold) following the construction or renovation (e.g., post construction/renovation. Also, the machine learning component 450 may monitor and learn the levels of satisfaction and the behavior patterns.

In one aspect, the machine learning component 450, in association with the feedback component 428, may collect user feedback (e.g., from devices 404) as part of determining an achieved level of satisfaction and/or dissatisfaction. The pattern history being created by the user and learned via the machine learning component 450, may also be assigned weighted values, via the ranking component 424, based on the priority levels for different parameters of the user's satisfaction. For example, the assigned weighted values to the pattern history can be assigned a positive and/or negative value based on a plurality of factors. For example, a weighted value may be assigned a weighted value for geographical content (e.g., the chances of natural calamity might overpower the priority of the kind of neighborhood and budget in certain scenarios). Therefore, the priority weights may be assigned (which may be the inputs into a machine learning operation for deep learning) in order to compute an overall satisfaction level. The overall satisfaction level can also be used for the user to resolve conflicting satisfaction levels (e.g. levels of happiness) between different priority/satisfactory levels.

The user, associated with devices 404, may be enabled to modify the 3-D virtual structure provided by the AR component 422, which may be displayed on one or more devices 404 such as, for example, in a location on top of the plot with the assistance of the machine learning operations (e.g., AI application). The user may adjust, update, or modify one or more features and/or dimensions of the structure (e.g., rooms, kitchen, lobby, pantry, bedroom, etc.) via an interactive graphical user interface ("GUI") (e.g., a multi touch enabled feature in a web application) provided by one or more devices 404. The user can dynamically visualize the design, modification, or adjustments on the devices 404 according to a build schedule, budget/costs, and/or for any changes the user make in real-time. The user can interact with features and/or dimensions of the structure (temporally) to observe and learn various items such as, for example, day light effects (e.g., where the sun shines when the sun rises, moves, and/or sets) by adjusting orientations or positions of the features and/or dimensions of the structure at different temporal periods over selected time periods (e.g., spring, summer, fall, winter, etc.).

The AR component 422 may also provide one or more interactive features and/or functionality in the 3D visual picture displayed via one or more devices 404 such as, for example, power window shades, lighting design changes, smart home enabled features (IoT features), and the like. Upon completion and/or approval of a design, modifications, and/or renovations, the user (e.g., a customer, builder, etc.) may be enabled to use a common schedule and work product. The AR component 422 may enable other users (e.g., contractors, workers, user, etc.) or other users to be notified of immediate changes. The changes may be visualized for each iterative or "next" step of the construction/renovation by directly accessing the approved design.

The UI controller 440 may be used to provide access to the cognitive event scheduling system 410 for each one of the UEs 440.

It should be noted that the database 430 may also work in conjunction with the AR component 422 to store, record, and/or maintain user profiles, user behavior, designs, modifications, upgrades, schedules, environmental data, activities of daily living ("ADL"), decisions, alternatives, criteria, subjects, topics, ideas, relationships, concepts, satisfaction levels, previously provided solutions, and/or other defined features.

The database 430 may track, identify, and associate all communication threads, messages, transcripts, and the like of all data generated during all stages of the development or "life cycle" of the user profiles, user behavior, designs, modifications, upgrades, schedules, environmental data, ADLs, decisions, alternatives, criteria, subjects, topics, ideas, relationships, concepts, satisfaction levels, previously provided solutions, and/or other defined features. The merging of the data into one database 430 (which may include a domain knowledge) allows the selection component 426 to act like a search engine, but instead of keyword searches, it will use an AI method of making cognitive associations between the data sources.

The UI controller 440 may be used to provide access to the cognitive structure selection system 410 for each one of the devices 404.

The feedback component 428 may be used to collect feedback information from the user in association with the one or more UE's 404. Also, the feedback component 428 may provide collected feedback to the machine learning component 450 and/or the design/modify component 432. Additionally, the machine learning component 450 may collect and/or learn one or more user preferences, activities of daily living (ADL), behavior patterns, and/or current or previous satisfaction levels of structure solutions. The feedback component 428 may also be used to receive feedback of a "choice selected" of a solution and/to adjust the ranking factors (e.g., the rankings) of a user.

In one aspect, the machine learning modeling, as described herein, may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state-space models, which may be completed by unsupervised learning techniques, particularly to learn the context and/or the indicators. Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Additionally, the cognitive structure selection system 410 may perform one or more calculations for cognitive structure selection according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
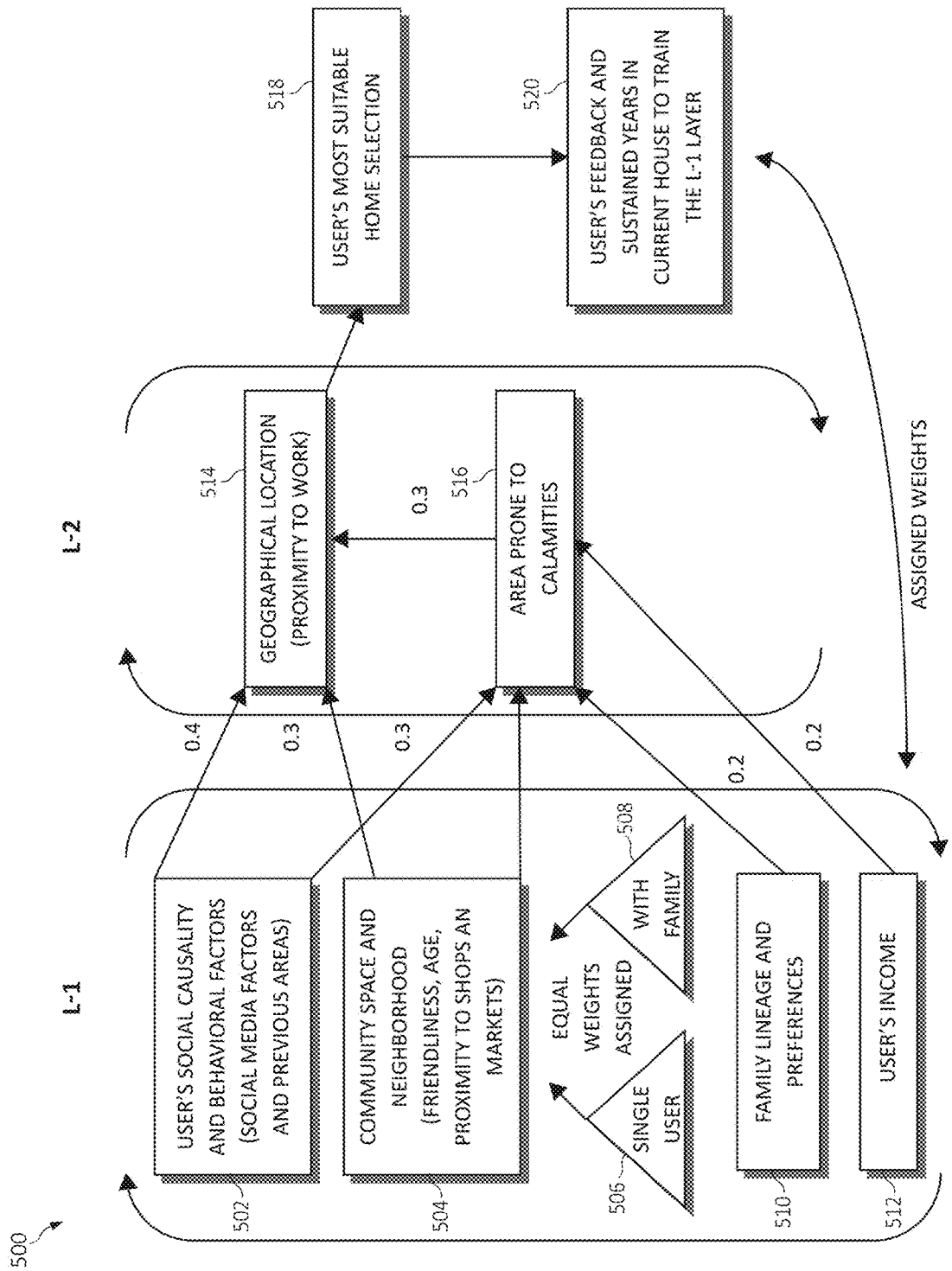
FIG. 5 is a block-flow diagram depicting an additional exemplary method for intelligent design structure selection in a computing environment by a processor, again in which aspects of the present invention may be realized.

Turning now to FIG. 5, a block diagram of exemplary functionality 500 relating to intelligent design structure selection in a computing environment. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere.

Starting with block 502, one or more social causality and behavioral factors (e.g., social media factors and previous area data) may be in a first level ("L-1") and assigned a weighted value such as, for example, 0.4 in relation to block 514 and 0.2 in relation to block 516. In block 504, community space and neighborhood factors (e.g., friendliness/safety, age, proximity to locations such as, for example, shopping centers, markets, schools, hospitals, religious/worship centers, public facilities, or other defined locations) may be assigned a weighted value such as, for example, 0.3 in relation to block 514 and 0.3 in relation to block 516. Block 506 depicts a single user and block 508 illustrates a family or "group" and both the single user and/or use with familial associates be assigned equal weights for block 504. Family lineage and/or user preferences 510 and user's income 512 may also have a determined or assigned weighted value such as, for example, 0.2 in relation to block 516.

Turning now to level 2 ("L-2"), block 514 may provide a geographical location factor (e.g., proximity to work) and may collect one or more weighted values from one or more factors from L-1. Similarly, block 516 may illustrate one or more areas prone to calamities (e.g., environmental constrains such as, for example, earthquakes, tornadoes, snow storms, hurricanes, etc.) and may collect one or more weighted values from one or more factors from L-1. Using the combined values from L-1, block 516 may also generate and determine a weighted value for the one or more areas prone to calamities such as, for example, 0.3 which may be used by block 514. From block 514, the weighted values may be used to provide one or more solutions that are most appropriate or satisfactory for the user (e.g., user's most suitable structure/home selection), as in block 518. User feedback may be collected over a selected period of time with the feedback being used to train one or more levels of satisfaction such as, for example, L-1 (e.g., feedback sustained for one or more years in the current structure/house to train L-1 layer), as in block 520.

Figure 6:
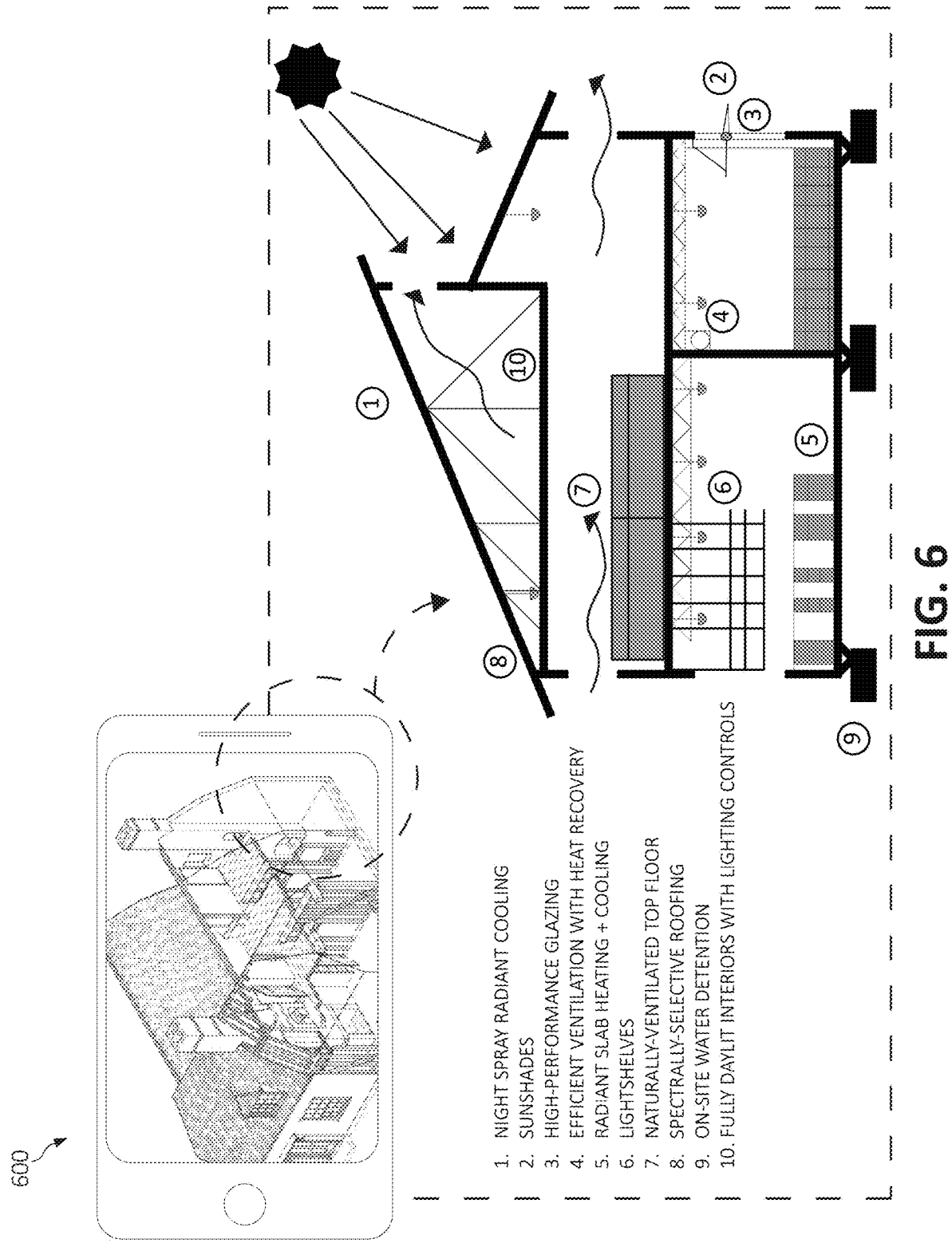
FIG. 6 is an additional block diagram depicting a three-dimensional dynamic structure using cognitive design structure selection in which aspects of the present invention may be realized.

FIG. 6 is an additional block diagram depicting a three-dimensional ("3D") dynamic structure 600 using cognitive design structure selection. The various functions, components, and descriptions of FIGS. 1-5 may be included in FIG. 6.

As depicted, an interactive 3D structure 600 may be displayed in an augmented reality computing environment, as described herein. For example, the interactive 3D structure 600 may include displaying one or more features, functionality, dimensions, and/or structural designs and/or modifications. For example, the interactive 3D structure 600 may include 1) night spray radiant cooling, 2) sunshades, 3) glazing (e.g., high-performing glazing), 4) ventilation with heat recover, 5) radiant slab heating and cooling, 6) light shelves, 7) naturally ventilated floor (e.g., on a top or highest floor), 8) spectrally-selective roofing, 9) on-site water detention, and/or 10) illuminated interiors with lighting controls (e.g., fully daylit interiors with lighting controls.

In one aspect, a user may interact with the interactive 3D structure 600 to design, change, update, modify, and/or adjust the one or more features, functionality, dimensions, and/or structural designs and/or modifications. For example, the day light effects may be simulated upon a facility by adjusting and/or modifying an orientation, position of the interactive 3D structure 600, and/or time of day/year.

Figure 7:
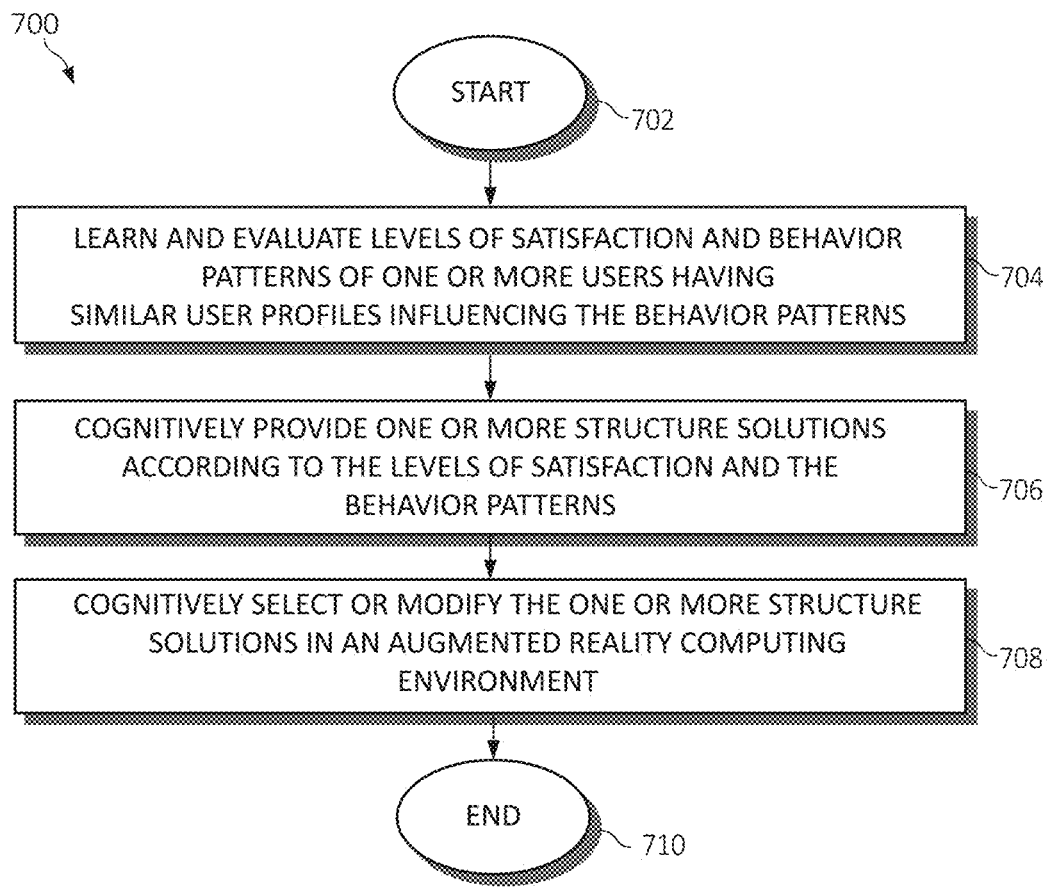
FIG. 7 is a flowchart diagram depicting an additional exemplary method for intelligent design structure selection in which aspects of the present invention may be realized.

Turning now to FIG. 7, a method 700 for intelligent design structure selection in an Internet of Things (IoT) computing environment is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 7600 may start in block 702.

Levels of satisfaction and behavior patterns of one or more users having similar user profiles influencing the behavior patterns may be learned and evaluated (e.g., using machine learning operations), as in block 704. One or more structure solutions may be cognitively suggested according to the levels of satisfaction and the behavior patterns, as in block 706. The one or more structure solutions may be cognitively selected and/or modified in an augmented reality computing environment, as in block 708. The functionality 700 may end in block 710.

Figure 8:
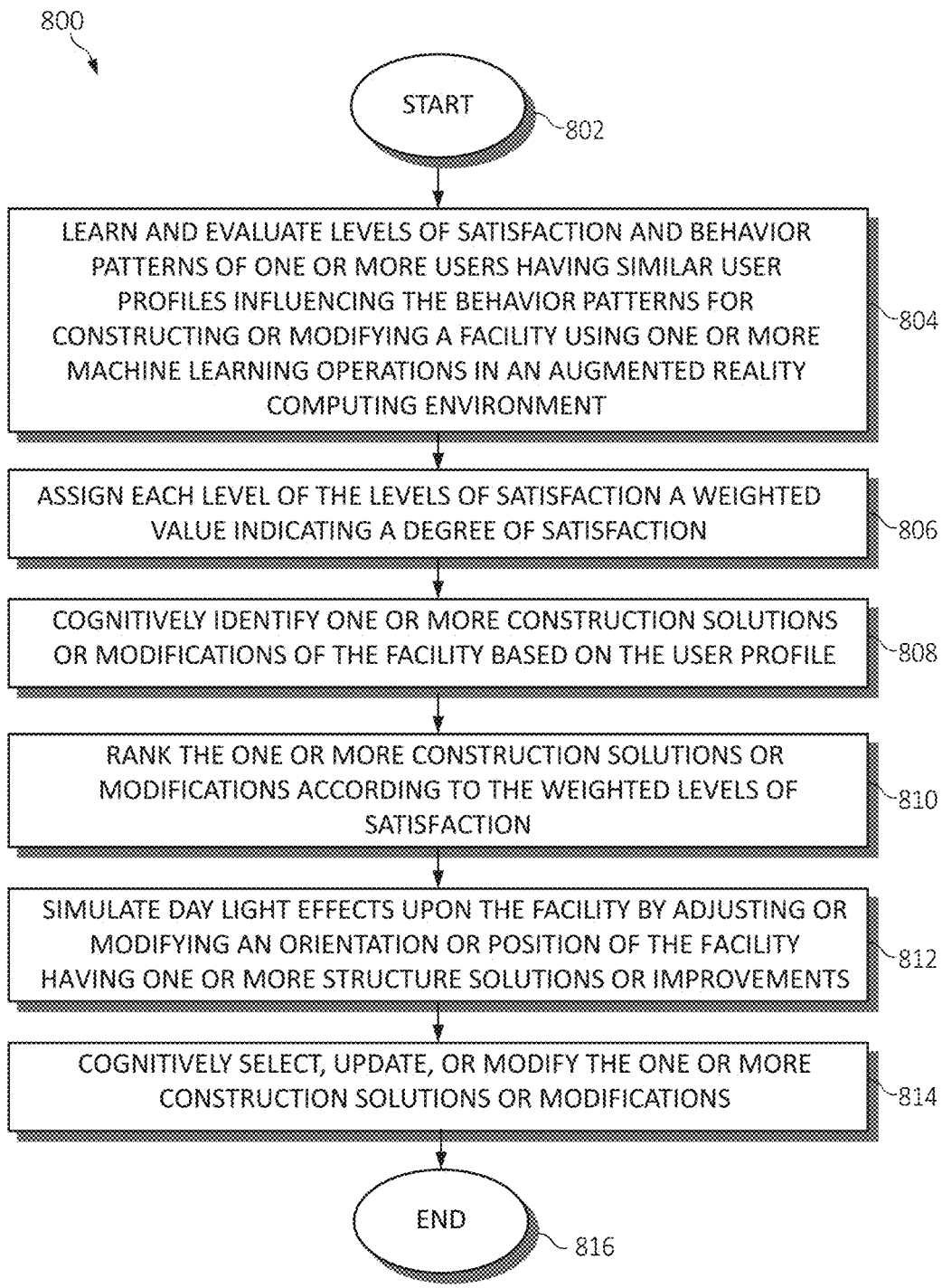
FIG. 8 is an additional flowchart diagram depicting an additional exemplary method for intelligent design structure selection in a computing environment by a processor, again in which aspects of the present invention may be realized.

Turning now to FIG. 8, a method 800 for intelligent design structure selection in an IoT computing environment is depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 802.

Levels of satisfaction and behavior patterns of one or more user having similar user profiles influencing the behavior patterns may be learned and evaluated for constructing and/or modifying a facility (e.g., a house, apartment, building, etc.) using one or more machine learning operations in an augmented reality computing environment, as in block 804. It should be noted that each user may have a user profile that includes user preferences, behaviors, an age group, one or more familial associates (e.g., family and relatives), one or more non-familial associates (e.g., friends, co-workers, associates, colleagues, etc.), an income level, location preferences, safety characteristics and preferences of a location (e.g., a building, neighborhood, community, etc.), environmental factors (weather data, geographic, etc.), user defined parameters (e.g., selected or defined preferences of a building, home, or apartment for living), or a combination thereof. Also, the levels of satisfaction may include one or more design/structure features and functionality, a preference for new design structure construction (e.g., a new house) or existing design structure renovation (e.g., renovating a house or apartment/condominium, etc.), a physical layout of a design structure, the proximity to one or more types of locations (e.g., work address, religious/worship buildings, public-use facilities (e.g., library, schools, law enforcement), geographical content, locality rules or legal constraints (e.g., government or home owners association "HOA" rules, regulations, laws, etc.), budget constraints, internet of things (IoT) devices enabled in the one or more design structure solutions, the user profiles, or a combination thereof.

Each level of the levels of satisfaction may be assigned a weighted value indicating a degree of satisfaction, as in block 806. A total confidence value may be generating upon taking into account each of the weighted values of the levels of satisfaction. One or more construction solutions or modifications of the facility may be cognitively identified based on the weighted values (and/or the total confidence value) and the user profiles, as in block 808. The various construction solutions or modifications may be ranked according to the weighted levels of satisfaction, as in block 810. Day light effects upon the facility may be simulated by adjusting or modifying an orientation or position of the facility having one or more structure solutions or improvements, as in block 812. The one or more one or more construction solutions or modifications may be cognitively selected, updated, or modified, as in block 814. The functionality 800 may end in block 816.

In one aspect, in conjunction with and/or as part of at least one block of FIGS. 7-8, the operations of methods 700 and 800 may include each of the following. The operations of methods 700 and 800 may monitor and learn the levels of satisfaction and the behavior patterns, cognitively suggest the one or more design structure solutions, and/or collect feedback information of the one or more users relating to the levels of satisfaction, the behavior patterns, and the one or more design structure solutions.

The operations of methods 700 and 800 may rank the one or more design structure solutions according to a determined confidence level. In association with the ranking, the operations of methods 700 and 800 may assign each level of the levels of satisfaction a weighted value indicating a degree of satisfaction and determine a confidence level accorded to each of the weighted values. The operations of methods 700 and 800 may further cognitively design, select, or modify the one or more design structure solutions (which may be presented in a three-dimensional orientation) in an augmented reality computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent design structure selection in a computing environment, comprising:
   receiving a plurality of data representative of dwelling information associated with a plurality of users, wherein the dwelling information is monitored over a predetermined timeframe and is indicative of behavior patterns of the one or more users, and wherein the dwelling information includes portions for community preferences, financial preferences, characteristics of previous structures lived in by the one or more users, and maintenance or repair characteristics associated with an upkeep of the previous structures;
   learning and evaluating levels of satisfaction and the behavior patterns of one or more of the plurality users having similar user profiles influencing the behavior patterns using one or more deep learning operations using a trained artificial neural network, wherein each portion of the dwelling information associated with the plurality of users is individually weighted according to weights defined by a respective one of the one or more of the plurality of users such that only those portions of the dwelling information that individually contributed to one or more predetermined thresholds according to the weights are selectively applied to the levels of satisfaction; and
   cognitively suggesting one or more design structure solutions according to the levels of satisfaction and the behavior patterns.

2. The method of claim 1, further including initializing a machine learning operation to:
   monitor and learn the levels of satisfaction and the behavior patterns;
   cognitively suggest the one or more design structure solutions; and
   collect feedback information of the one or more users relating to the levels of satisfaction, the behavior patterns, and the one or more design structure solutions.

3. The method of claim 1, further including ranking the one or more design structure solutions according to a determined confidence level.

4. The method of claim 1, further including:
   assigning each level of the levels of satisfaction a weighted value indicating a degree of satisfaction; and
   determining a design structure solution confidence level accorded to each of the weighted values.

5. The method of claim 1, further including:
   defining the user profiles according to an age group, one or more familial associates, one or more non-familial associates, an income level, location preferences, safety characteristics of a location, environmental factors, user defined parameters, or a combination thereof; and
   defining the levels of satisfaction according to design structure features and functionality, a preference for new design structure construction or existing design structure renovation, a physical layout of a design structure, the proximity to one or more types of locations, geographical content, locality rules or legal constraints, budget constraints, internet of things (IoT) devices enabled in the one or more design structure solutions, the user profiles, or a combination thereof.

6. The method of claim 1, wherein the cognitive suggesting further includes cognitively designing, selecting, or modifying the one or more design structure solutions in an augmented reality computing environment.

7. The method of claim 1, further including simulating day light effects upon a facility by adjusting or modifying an orientation or position of the facility having the one or more design structure solutions.

8. A system for intelligent design structure selection in an Internet of Things (IoT) computing environment, comprising:
   one or more computers with executable instructions that when executed cause the system to:
   receive a plurality of data representative of dwelling information associated with a plurality of users, wherein the dwelling information is monitored over a predetermined timeframe and is indicative of behavior patterns of the one or more users, and wherein the dwelling information includes portions for community preferences, financial preferences, characteristics of previous structures lived in by the one or more users, and maintenance or repair characteristics associated with an upkeep of the previous structures;
   learn and evaluate levels of satisfaction and the behavior patterns of one or more of the plurality users having similar user profiles influencing the behavior patterns using one or more deep learning operations using a trained artificial neural network, wherein each portion of the dwelling information associated with the plurality of users is individually weighted according to weights defined by a respective one of the one or more of the plurality of users such that only those portions of the dwelling information that individually contributed to one or more predetermined thresholds according to the weights are selectively applied to the levels of satisfaction; and
   cognitively suggest one or more design structure solutions according to the levels of satisfaction and the behavior patterns.

9. The system of claim 8, wherein the executable instructions further initialize a machine learning operation to:
- monitor and learn the levels of satisfaction and the behavior patterns;
- cognitively suggest the one or more design structure solutions; and
- collect feedback information of the one or more users relating to the levels of satisfaction, the behavior patterns, and the one or more design structure solutions.

10. The system of claim 8, wherein the executable instructions further rank the one or more design structure solutions according to a determined confidence level.

11. The system of claim 8, wherein the executable instructions further:
- assign each level of the levels of satisfaction a weighted value indicating a degree of satisfaction; and
- determine a confidence level accorded to each of the weighted values.

12. The system of claim 8, wherein the executable instructions further:
- define the user profiles according to an age group, one or more familial associates, one or more non-familial associates, an income level, location preferences, safety characteristics of a location, environmental factors, user defined parameters, or a combination thereof; and
- define the levels of satisfaction according to design structure features and functionality, a preference for new design structure construction or existing design structure renovation, a physical layout of a design structure, the proximity to one or more types of locations, geographical content, locality rules or legal constraints, budget constraints, internet of things (IoT) devices enabled in the one or more design structure solutions, the user profiles, or a combination thereof.

13. The system of claim 8, wherein the executable instructions further cognitively design, select, or modify the one or more design structure solutions in an augmented reality computing environment.

14. The system of claim 8, wherein the executable instructions further simulate day light effects upon a facility by adjusting or modifying an orientation or position of the facility having the one or more design structure solutions.

15. A computer program product for intelligent design structure selection by a processor, the computer program product comprising a non-transitory computer-readable storage medium having computer-readable program code portions stored therein, the computer-readable program code portions comprising:
- an executable portion that receives a plurality of data representative of dwelling information associated with a plurality of users, wherein the dwelling information is monitored over a predetermined timeframe and is indicative of behavior patterns of the one or more users, and wherein the dwelling information includes portions for community preferences, financial preferences, characteristics of previous structures lived in by the one or more users, and maintenance or repair characteristics associated with an upkeep of the previous structures;
- an executable portion that learns and evaluates levels of satisfaction and the behavior patterns of one or more of the plurality users having similar user profiles influencing the behavior patterns using one or more deep learning operations using a trained artificial neural network, wherein each portion of the dwelling information associated with the plurality of users is individually weighted according to weights defined by a respective one of the one or more of the plurality of users such that only those portions of the dwelling information that individually contributed to one or more predetermined thresholds according to the weights are selectively applied to the levels of satisfaction; and
- an executable portion that cognitively suggests one or more design structure solutions according to the levels of satisfaction and the behavior patterns.

16. The computer program product of claim 15, further including an executable portion that initializes a machine learning operation to:
- monitor and learn the levels of satisfaction and the behavior patterns;
- cognitively suggest the one or more design structure solutions; and
- collect feedback information of the one or more users relating to the levels of satisfaction, the behavior patterns, and the one or more design structure solutions.

17. The computer program product of claim 15, further including an executable portion that ranks the one or more design structure solutions according to a determined confidence level.

18. The computer program product of claim 15, further including an executable portion that:
- assigns each level of the levels of satisfaction a weighted value indicating a degree of satisfaction; and
- determines a design structure solution confidence level accorded to each of the weighted values.

19. The computer program product of claim 15, further including an executable portion that:
- defines the user profiles according to an age group, one or more familial associates, one or more non-familial associates, an income level, location preferences, safety characteristics of a location, environmental factors, user defined parameters, or a combination thereof; and
- defines the levels of satisfaction according to design structure features and functionality, a preference for new design structure construction or existing design structure renovation, a physical layout of a design structure, the proximity to one or more types of locations, geographical content, locality rules or legal constraints, budget constraints, internet of things (IoT) devices enabled in the one or more design structure solutions, the user profiles, or a combination thereof.

20. The computer program product of claim 15, further including an executable portion that:
- cognitively designs, selects, or modifies the one or more design structure solutions in an augmented reality computing environment; or
- simulates day light effects upon a facility by adjusting or modifying an orientation or position of the facility having the one or more design structure solutions.

* * * * *